(12) United States Patent
Keyson

(10) Patent No.: US 6,518,951 B1
(45) Date of Patent: *Feb. 11, 2003

(54) MULTIPERSON TACTUAL VIRTUAL ENVIRONMENT

(75) Inventor: David V. Keyson, Eindhoven (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 103 days.

(21) Appl. No.: 09/235,362

(22) Filed: Jan. 21, 1999

(30) Foreign Application Priority Data

Jan. 23, 1998 (EP) .......................... 98200180

(51) Int. Cl.[7] ................................. G09G 5/00
(52) U.S. Cl. ............... 345/156; 345/157; 345/158; 463/36; 463/39
(58) Field of Search ................ 345/156, 157, 345/158; 463/36–38, 39; 473/220–226

(56) References Cited

U.S. PATENT DOCUMENTS

| 5,405,152 | A |   | 4/1995  | Katanics et al. | 273/438 |
|-----------|---|---|---------|-----------------|---------|
| 6,008,777 | A | * | 12/1999 | Yiu             | 345/2   |
| 6,020,875 | A | * | 2/2000  | Moore et al.    | 345/156 |
| 6,028,593 | A | * | 2/2000  | Rosenberg et al.| 345/156 |
| 6,072,482 | A | * | 6/2000  | Moon et al.     | 345/333 |
| 6,075,515 | A | * | 6/2000  | Keyson          | 345/156 |

FOREIGN PATENT DOCUMENTS

WO          97/44775     11/1997     ............ G09G/5/00

* cited by examiner

Primary Examiner—Richard Hjerpe
Assistant Examiner—Kimnhung Nguyen
(74) Attorney, Agent, or Firm—Michael Schmitt

(57) ABSTRACT

The invention relates to a method and a terminal for providing a common virtual environment to a plurality of users, for example a game environment. According to the method, each user is provided with an actuator allowing for receiving mechanical input from the user as well as for outputting mechanical feedback to the user. The user controls with the mechanical input a position of a corresponding user object (102) with respect to the virtual environment, and receives tactual cues as originating from tactual environment objects (130, 132, 134) and from distant user objects (104) that are present in the virtual environment. According to the invention, the user can position at least one of the tactual environment objects (130, 132, 134) by appropriate positioning actions.

18 Claims, 2 Drawing Sheets

MULTIPERSON TACTUAL VIRTUAL ENVIRONMENT

BACKGROUND OF THE INVENTION

The invention relates to a method of providing a common virtual environment to a plurality of users, at least one user being provided with a local actuator for receiving mechanical input from the user and for outputting mechanical feedback to the user, the method comprising the steps of:

adjusting for the at least one user, in response to the mechanical input, a position of a corresponding user object with respect to the virtual environment comprising tactual environment objects, and presenting to the at least one user, through the mechanical feedback, tactual cues as originating from the tactual environment objects and from distant user objects. The invention further relates to a terminal for use with such a method.

U.S. Pat. No. 5,405,152 describes a multiplayer game in which each player is represented by a corresponding icon on a screen. The screen further displays a virtual environment through which each player can virtually move by manipulating a corresponding user actuator. Points can be scored by virtually colliding with other players. In the known method, a central processing unit keeps track of the players' virtual positions and sends command signals to the players' actuators in case of particular events such as an icon colliding with another icon or with tactual environment objects in the virtual environment like planets and regions of turbulence. The command signals provoke the relevant user actuator to provide the player with mechanical feedback in conformance with the event, thereby adding realism to the playing of the game.

A disadvantage of the known method is that the virtual environment that is presented has limited attractivity.

SUMMARY OF THE INVENTION

It is an object of the invention to provide a method as specified in the preamble, which provides a more interesting tactual virtual environment. To this end, the method according to the invention is characterized by the step of positioning at least one of the tactual environment objects in response to positioning actions by at least one of the users. Besides simple movement of a tactual environment object from one place to another in the virtual environment, positioning also means creation of a tactual environment object into the virtual environment or removal of a tactual environment object from the virtual environment. Thus, the invention enables a user to create, move and remove obstacles that are actually felt by the other users, thereby enabling him to customize the virtual environment to his own wishes and to have a greater influence on the course of events.

An advantage of the measure of claim 2 is that the users can adjust the tactual properties of individual tactual environment objects, thereby providing the users with a still larger hold on the look and feel of the virtual environment.

An advantage of the measure of claim 3 is that the tactual properties of the users themselves are dynamic. In a game environment for example, a user just having taken in food provokes a heavier blow when colliding with an other user, indicating that his strength has increased.

An advantage of the measure of claim 4 is that a user can confront an other user with a tactual environment object that is visually but not tactually hidden from him. Preferably, only the user from which such an invisible object originates is presented with a visual representation of the object. This further enriches the virtual environment.

An advantage of the measure of claim 5 is that more processing can be done locally. Specifically, the tactual feedback resulting from the virtual environment can be initiated locally in contrast with the known method centrally initiating all tactual feedback. In this way, the amount of required communication and central processing is reduced. These demands would otherwise increase to unacceptable levels as a result of the increased hold that users have on the look and feel of the virtual environment as offered by the invention. The library can be part of the application software or be application-independent. In the latter case, the library could be incorporated in the system software of which applications can make use of. In this manner, the library is accessible to a multitude of applications. The library can also be located within the actuator.

These and other aspects of the invention will be apparent from and elucidated with reference to the embodiments described hereinafter.

DESCRIPTION OF THE PREFERRED EMBODIMENTS

Figure 1:
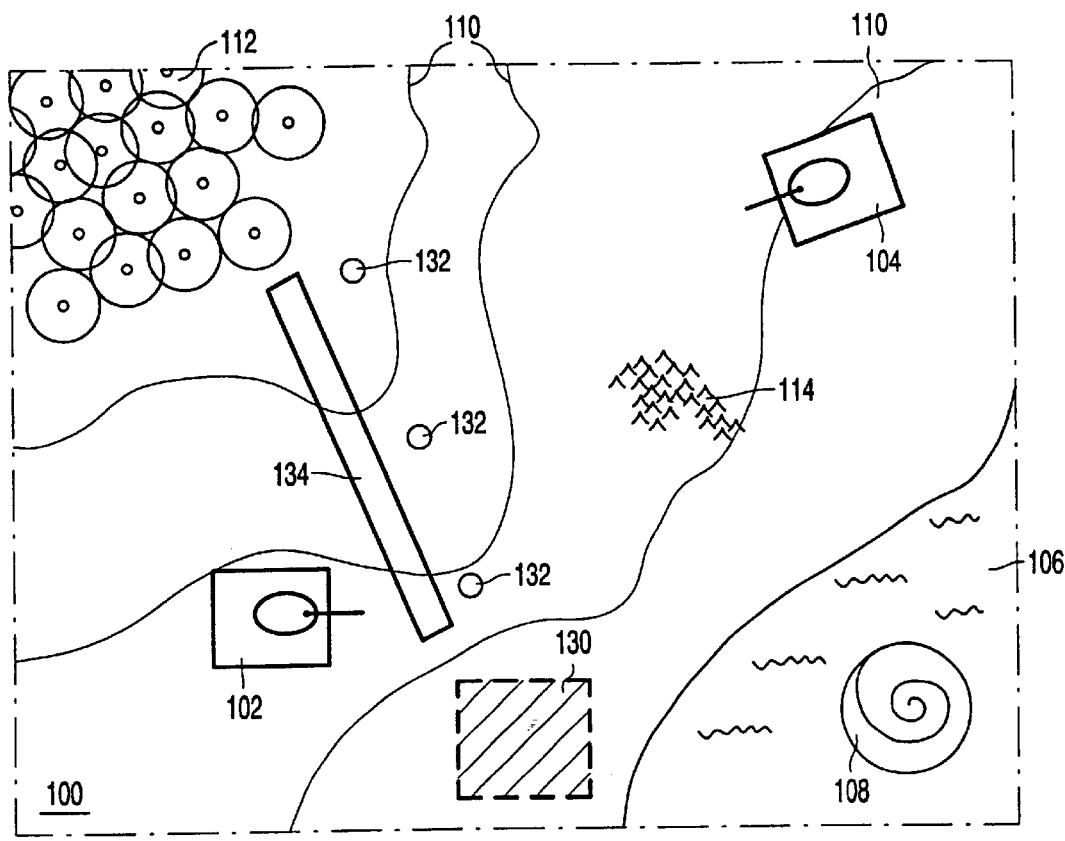
FIG. 1 shows a schematic view of a scene from a video game in which the invention is applied.

FIG. 1 shows a schematic view of a scene from a video game in which the invention is applied. It shows a visual representation of a virtual environment ('theater of war') 100 for a tank battle. Using respective interconnected terminals, a first and a second user move user objects, namely a tank 102 and a tank 104, respectively, through a natural area. Each user is presented with the visual representation of the virtual environment of FIG. 1 on displays that are integrated in the terminals. The users control the movement of their tanks by manipulating respective actuators that are also integrated in the terminals. Here we assume the actuators are trackballs with force feedback, as disclosed for example in EP-A 489 469 (PHN 13,522, U.S. patent application Ser. No. 08/678,115) and EP-A 760 118 (PHN 15,232, U.S. patent application Ser. No. 08/615,559). Such a trackball comprises a rotatable member that is mounted in a housing and motors for transmitting forces to a user via the rotatable member. By means of these forces, the users are enabled to feel the virtual environment 100 while moving their tanks 102, 104. These forces are determined by the tactual properties of tactual environment objects that are present in the virtual environment.

In FIG. 1, examples of such tactual environment objects are a river 106 comprising a kind of maelstrom 108, a hilly terrain, the slopes of which being indicated by contours 110, a forest 112 and bumpy surface 114. Each of these tactual environment objects has certain tactual properties that are translated into tactual cues when a user object enters a region of influence of the tactual environment object or actually collides with such an object. For example, when one of the tanks 102, 104 enters the river 106, the corresponding user will actually feel that he can more freely manipulate the actuator, thereby suggesting that he looses grip. When approaching the maelstrom 108, the user will feel a force in a direction tangential to the maelstrom 108. Beyond a certain point, he will enter a violent spin that is felt through the actuator. The user feels a gradient of terrain altitude via the actuator as a force that is proportional to a gradient of terrain altitude in correspondence with the contours 110. When moving through the forest 112, the user will feel a succession of blows opposite to the direction of movement, representing the snapping of trees. The bumpy surface 114 can be felt via the actuator as a vibration of the member. These objects are hard-programmed, this means that they are not user manipulatable.

According to an aspect of the invention, in addition to the hard-programmed tactual environment objects, users can create, move and remove certain user-manipulatable tactual environment objects. In FIG. 1, user-manipulatable tactual environment objects are a pit 130, anti-tank blocks 132 and a wall 134. They are assumed to be part of a defense line that is erected during the game by the first user. When either one of the users moves his corresponding tank 102 or 104 beyond a certain point into the pit 130, his control over the tank diminishes and a force on the member in the direction of movement will establish a virtual pull on the tank, dragging the latter into the pit 130. In this way, the user feels his tank virtually slipping into the pit 130. The pit 130 is assumed to be made invisible to the second user, but it can be seen by the first user, who actually 'dug' it. The anti-tank blocks 132 establish impenetrable obstacles that provoke a rigid force on the actuator member impeding a movement of the member beyond a certain position. The wall 134 has a similar effect, but is assumed to break down when rammed by a tank that has a momentum beyond a certain minimum threshold, thereby allowing the passing through of the tank.

Any one of the tactual environment objects 130, 132 and 134 can be moved or removed by appropriate positioning actions of either user. By dragging and dropping tactual environment objects on top of one another, the user can create new tactual feedback effects, that are composed of a combination of the original effects. Alternatively, either player can adjust the tactual properties of these objects by appropriate adjustment actions. For example, by decreasing the depth of the pit 130, the pull that is felt by the users when moving into the pit 130 is lowered. Furthermore, by appropriate alteration actions the users can alter the tactual properties of the tanks. For example, by moving his tank through a magnet somewhere in the virtual environment, either one of the users can 'magnetize' his tank. Subsequently, the other users will experience an attractive force in the direction of the magnetized tank. The magnetization gradually wears off.

Particularly in a strategy game like this tank battle game, the advantages of the invention are apparent. The user can manipulate the environment as if he were a military engineer. Moreover, the tactual properties of the user objects are not static, as in the known method, but can be altered by the users. This all broadens the hold of the user on the course of events and increases the level of his participation.

The mechanical influence of a tactual environment object, be it a hard-programmed one or one that is positioned by the users, is in some cases limited to a small area, like with a virtual wall, which upon colliding with a user object provokes the actuator corresponding to that user object to simulate an impact. Alternatively, a tactual environment object's mechanical influence on the users can extend over an arbitrary large part of the virtual environment, e.g. when the tactual environment object virtually incurs some kind of gravitational force.

Besides tactual environment objects, that are environment objects having tactual properties that can be felt by the users, the virtual environment could furthermore contain environment objects that have no tactual properties. An example of such an environment object is a visual mark on the ground or a cloud of gas, etc.

Instead of presenting the users with a plan view, the visual presentation of the virtual environment to the user could simulate the perspective of the user objects, like is usually done in virtual reality. The number of users that can simultaneously move through the virtual environment is not principally limited to two, as in the present embodiment. The method of the invention could be used in combination with an arbitrary number of users.

Figure 2:
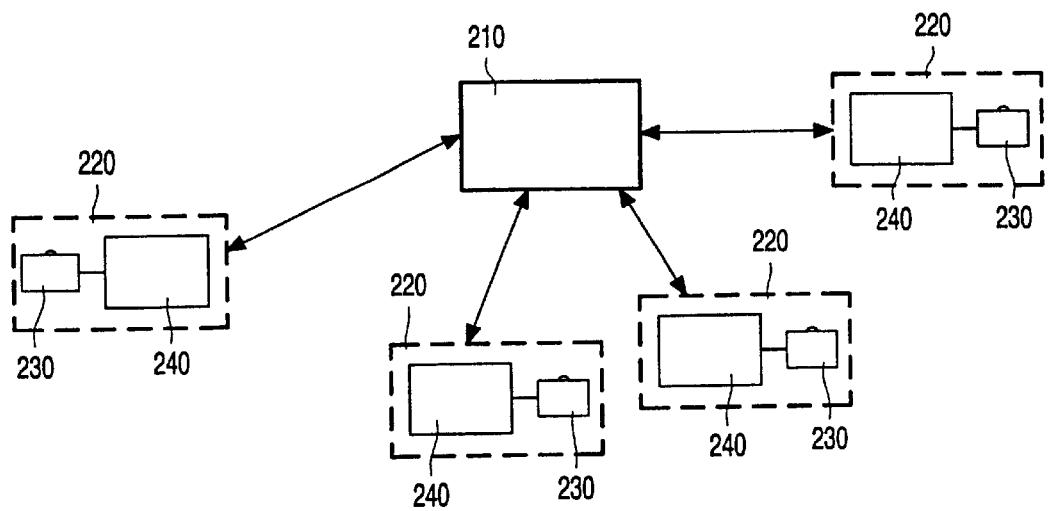
FIG. 2 shows a set-up in which the method according to the invention can be applied.

FIG. 2 shows a setup in which the method according to the invention can be applied. A central server 210 is connected to a number of terminals 220 via a network. Each of the terminals 220 is a box in which an actuator 230 being a force feedback trackball, a local processing unit 240, a display and speakers (not shown) are incorporated. Alternatively, the processing unit 240 is incorporated in a settop-box and that the trackball is included in a remote that cooperates with the settop-box. A visual and an auditory representation of the virtual environment is presented via a television set that is a further part of each terminal 220. Alternatively, each terminal includes a personal computer with additional peripherals, such as a stand-alone force feedback trackball, modem, etc.

The central server 210 is responsible for keeping the virtual environment consistent. Hereto, the terminals 220 regularly sent scripts to the central server 210. The scripts contain information about the actions performed by the each user and the position of the corresponding user objects. A script could contain information about positioning actions of users, by which a tactual environment object is positioned or about adjustment actions, by which tactual properties of a tactual environment object are adjusted. Similarly, a script could contain information about an alteration action performed by a user, by which tactual properties of his user object are altered. The central server interprets the scripts and redistributes the information that should be present at the other terminals. During this process, the central server 210 can filter out and manipulate information before the redistribution step. Other tasks of the central server 210 are managing user accounts, identifying users at login time and recording user profiles. A different distribution of the various tasks over the central server 210 and the terminals 220 can be imagined.

Figure 3:
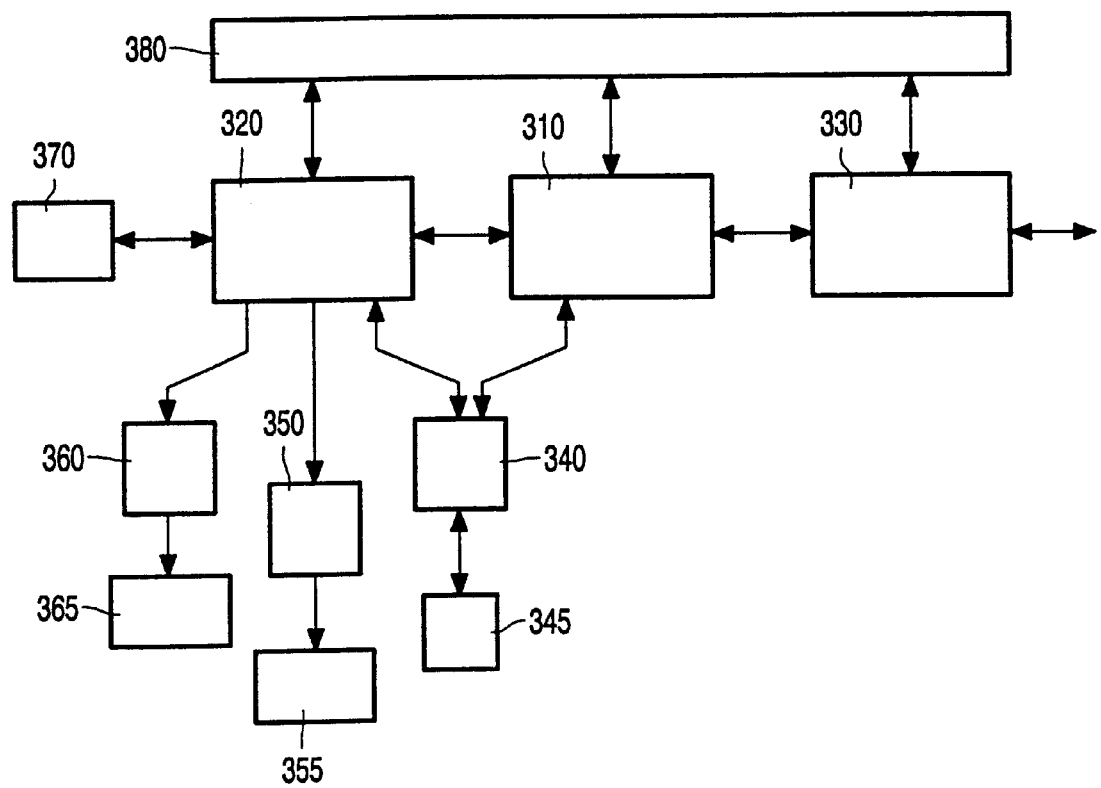
FIG. 3 shows a functional block diagram of a terminal through which a virtual environment can be presented and manipulated according to the invention.

FIG. 3 shows a functional block diagram of a terminal through which a virtual environment can be presented and manipulated according to the invention. The terminal has a communication manager 330 for sharing the virtual environment with distant terminals. A local actuator 345 is provided for receiving mechanical input from a local user as well as for outputting mechanical feedback to the local user. An application manager 310 is arranged for adjusting for the local user, in response to the mechanical input, a position of a corresponding local user object with respect to the virtual environment. A virtual environment presentation manager 320 is included for presenting to the local user, through the mechanical feedback, tactual cues as originating from tactual environment objects and from distant user objects that are present in the virtual environment.

A device driver 340 provides a link between the virtual environment presentation manager 320 and the application manager 310 on the one hand, and the tactual feedback actuator 345 on the other hand. Besides a tactual representation, the virtual environment presentation manager 320 also provides the user with a visual and an auditory representation of the virtual environment. Hereto, the virtual environment presentation manager 320 is linked to device drivers 350 and 360, controlling a built-in display 355 and built-in speakers 365, respectively. Main control unit 380 has a scheduling function, it allocates hardware resources within the terminal to the elements 310, 320, 330 so that they can perform their tasks. Alternatively, each one of the elements 310, 320, 330 can be realized with dedicated hardware, in which case the separate control unit 380 is redundant. The various tasks can also be differently organized within the terminal.

According to an aspect of the invention, the application manager is arranged for positioning at least one of the tactual environment objects in response to positioning actions by the local user. Upon identifying such a positioning action, the application manager 310 takes care of updating the virtual environment both locally through the virtual environment presentation manager 320 and at the distant terminals through the communication manager 330. The same applies to adjustment actions and alteration actions of the user, by which tactual properties of tactual environment objects and user objects, respectively, are modified.

According to an aspect of the invention, the virtual environment presentation manager is arranged for keeping a topography of the virtual environment and for obtaining tactual properties of a particular tactual environment object within the topography by referencing a locally present library 370 of generic tactual fields. With both the topography and the library 370 being located within the terminal, all information for generating the tactual feedback is locally present. Thus, extensive communication with the central server is avoided and the generation of the tactual feedback can be performed locally. The library 370 is stored in a memory and can be updated through downloading additional tactual fields or through creation and modification of tactual fields by the local user.

It should be noted that the above-mentioned embodiments illustrate rather than limit the invention and that those skilled in the art will be able to design many alternative embodiments without departing from the scope of the appended claims. In the claims, any reference signs placed between parentheses shall not be construed as limiting the claim. The invention,can be implemented by means of hardware comprising several distinct elements, and by means of a suitably programmed computer. In the device claim enumerating several means, several of these means can be embodied by one and the same item of hardware.

What is claimed is:

1. A method of providing a common virtual environment to a plurality of users, at least one user being provided with an actuator for receiving mechanical input from the at least one user and for outputting mechanical feedback to the at least one user, the virtual environment comprising tactual environment objects, the method comprising:

adjusting for the at least one user, in response to the mechanical input, a position of a corresponding user object with respect to the virtual environment;

presenting to the at least one user, through the mechanical feedback, tactual cues as originating from the tactual environment objects and from one or more distant user objects; and allowing at least one of the users to alter a tactual property of at least one of the tactual environment objects, wherein the tactual cues corresponding to the tactual property is adjusted according to the user's modification.

2. The method as claimed in claim 1, further including altering tactual properties of at least one of the user objects in response to alteration actions by at least one of the users.

3. The method as claimed in claim 1, further including visually hiding at least one of the tactual environment objects for at least one of the users.

4. The method as claimed in claim 1, wherein the at least one user is provided with processing means, the method further including:

keeping a topography of the virtual environment in the processing means, and obtaining tactual properties of a particular tactual environment object within the topography by referencing a library of generic tactual fields that is kept in the processing means.

5. A system for presenting a virtual environment to a user, the system comprising:

communication means for sharing the virtual environment with a distant system;

an actuator for receiving mechanical input from the user and for outputting mechanical feedback to the user;

an application manager for adjusting for the user, in response to the mechanical input, a position of a corresponding user object with respect to the virtual environment comprising tactual environment objects; and a virtual environment presentation manager for presenting to the user, through mechanical feedback, tactual cues as originating from said tactual environment objects and from distant user objects, wherein the application manager is arranged for modifying a tactual property and one or more tactual cues associated with the tactual property of at least one of the tactual environment objects in response to the user altering the tactual property.

6. The system as claimed in claim 5, wherein the application manager is arranged for altering tactual properties of the user object in response to alteration actions by the user.

7. The system as claimed in claim 5, wherein the application manager is arranged for visually hiding at least one of the tactual environment objects for the user.

8. The system as claimed in claim 5, wherein the virtual environment presentation manager is arranged for keeping a topography of the virtual environment and for obtaining tactual properties of a particular one of the tactual environment objects within said topography by referencing a library of generic tactual fields.

9. A computer game comprising:

an application manager that is configured to adjust a position of a user object in response to an input from a user; and a presentation manager that is configured to present mechanical feedback to the user in response to tactual cues, the tactual cues corresponding at least in part to virtual interactions between the user object and tactual environmental objects, and wherein the application manager is further configured to facilitate modifying a tactual property of at least one of the tactual environmental objects in response to the user altering the tactual property of at least one of the tactual environmental objects.

10. The computer game of claim 9, further including
a communication manager that is configured to enable sharing of the game with a remote user,
wherein
the remote user also receives mechanical feedback, in response to virtual interactions between an other user object that is under control of the remote user and the tactual environmental objects.

11. The computer game of claim 5, wherein
the presentation manager is further configured to:
 maintain a topography corresponding to locations of the tactual environmental objects, and
 obtain tactual properties of one or more of the tactual environment objects within the topography by referencing a library of generic tactual fields.

12. A method of providing a common virtual environment to a plurality of users, comprising:
 providing a tactual environment to at least one tactual user having a tactual environment manipulation device, the tactual environment comprising one or more user objects and one or more background objects, each of the user objects being adapted to move with respect to the background objects to represent actions of the at least one tactual user, the user objects and the background objects providing mechanical feedback to the at least one tactual user; and
 enabling the at least one tactual user to alter a tactual property of at least one of the background objects,
 wherein one or more tactual cues associated with the altered tactual property are automatically adjusted to provide altered mechanical feedback according to the altered tactual property.

13. The method of claim 12, wherein the tactual property is position.

14. The method of claim 12, wherein the tactual property is a field having a given effect on user objects within a given range of the background object having the tactual property.

15. The method of claim 14, wherein the field is a simulated gravitational field.

16. The method of claim 14, wherein the field is a simulated magnetic field.

17. The method of claim 12, wherein the tactual property is a mechanical resistance representing motion or feel of a respective one of the environment objects.

18. The method of claim 12, further comprising a step of enabling the at least one of the tactual users to conceal the resulting alteration.

* * * * *